United States Patent [19]

Caspers et al.

[11] Patent Number: 5,034,937
[45] Date of Patent: Jul. 23, 1991

[54] MAGAZINE-TYPE RECORD PLAYER

[75] Inventors: Johannes Caspers, Villingen-Schwenningen; Helmut Laufer, St. Georgen, both of Fed. Rep. of Germany

[73] Assignee: Deutsche Thomson-Brandt GmbH, Villingen-Schwenningen, Fed. Rep. of Germany

[21] Appl. No.: 228,926
[22] PCT Filed: Nov. 6, 1987
[86] PCT No.: PCT/EP87/00684
§ 371 Date: Apr. 5, 1988
§ 102(e) Date: Apr. 5, 1988
[87] PCT Pub. No.: WO88/03694
PCT Pub. Date: May 19, 1988

[30] Foreign Application Priority Data

Nov. 14, 1986 [DE] Fed. Rep. of Germany ....... 3638913

[51] Int. Cl.⁵ ............................................. G11B 17/22
[52] U.S. Cl. ...................................... 369/36; 369/77.1; 369/178
[58] Field of Search ..................... 369/36, 75.1, 77.1, 369/75.2, 178, 180, 191, 192, 197

[56] References Cited

U.S. PATENT DOCUMENTS

| | | | |
|---|---|---|---|
| 4,510,591 | 4/1985 | Schatteman | 369/77.1 |
| 4,644,515 | 2/1987 | Allebest et al. | 369/36 |
| 4,670,866 | 6/1987 | Hasegawa et al. | 369/36 |

FOREIGN PATENT DOCUMENTS

| | | | |
|---|---|---|---|
| 0063894 | 4/1982 | European Pat. Off. | 369/36 |
| 0212698 | 3/1987 | European Pat. Off. | 369/75.1 |

OTHER PUBLICATIONS

*IBM Technical Disclosure Bulletin*, vol. 20, No. 12, "Orient and Interlock Sensor Arrangement for Diskette Picker Mechanism", May 1978 by C. A. Larson, D. L. Lochner and G. C. Thomas, pp. 5281–5286.

*Primary Examiner*—Benjamin R. Fuller
*Assistant Examiner*—R. Gibson
*Attorney, Agent, or Firm*—Max Fogiel

[57] ABSTRACT

A record player in which a magazine is provided with compartments for storing a number of rigid and flexible disk-shaped recording media. For playing the disks, they are removed only to an extent necessary for the disk drive to engage bores of the disk. Each compartment has a bottom with a semi-circular recess at a side of the magazine from which the recording media are removed for being played. This recess has a diameter that is substantially longer than the diameter of the respective disk to be played, so that the disk can rotate freely while being played. Each compartment, furthermore, as a storage recess above the semi-circular recess for storing the disk. To play the disk, the latter is lowered from the storage recess into the semi-circular recess, but the lowering of the disk is such that the disk will not contact the bottom of the semi-circular recess, so as to allow free rotation of the disk within the semi-circular recess.

1 Claim, 1 Drawing Sheet

MAGAZINE-TYPE RECORD PLAYER

BACKGROUND OF THE INVENTION

The invention concerns a magazine-type record player with compartments that can accommodate several disk-shaped recording media and with a mechanism for removing the disk-shaped recording media from the compartments in the magazine.

Record players of this type include for example compact-disk players or videodisk players as well as computers that employ storage devices in the form of disk-shaped recording media. With known compact-disk players, a mechanism completely removes from the magazine the disk that is to be played and positions it on the disk-drive mechanism. Once it has been played, the disk is thrust back into the compartment provided for it.

One essential drawback of this type of compact-disk player is that the magazine takes up a lot of space, and this is a special problem for players installed in vehicles because the instrument panel does not have much room for the radio, the cassette recorder, and a compact-disk player.

SUMMARY OF THE INVENTION

The object of the invention is accordingly to improve a magazine-type record player to the extent that it will take up little space.

This object is attained in accordance with the invention in that a disk-shaped recording medium that is to be played is removed from the magazine only to the extent that the disk-drive mechanism can engage the bore in the medium.

DESCRIPTION OF THE PREFERRED EMBODIMENTS

Figure 1:
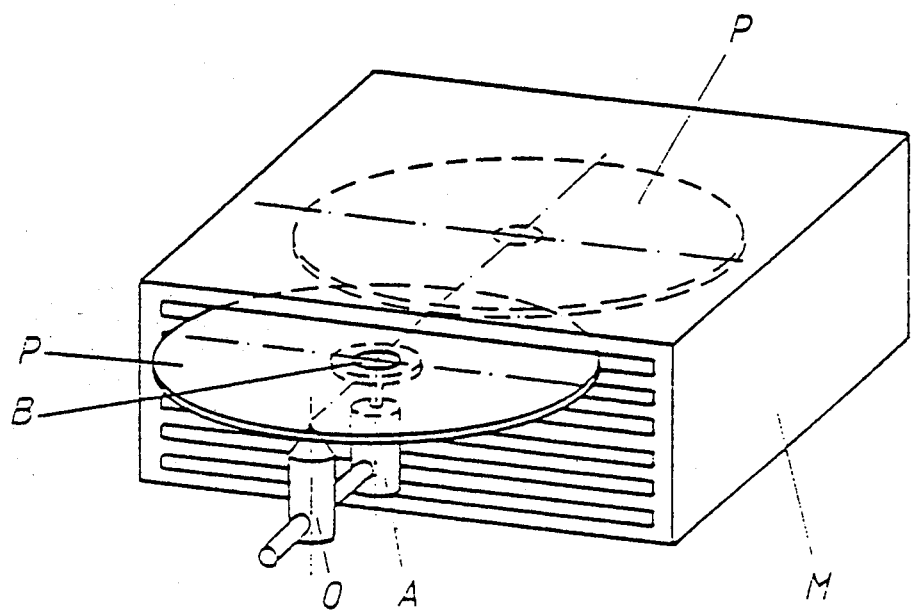
FIG. 1 illustrates the optical scanner, the disk-drive mechanism, and the magazine of a compact-disk player in accordance with the invention

FIG. 1 shows how a compact disk P is played. It is removed from a magazine M only far enough for a disk-drive mechanism A to engage the bore B in the disk. An optical scanning system O reads out the data stored in the spiral tracks on the disk.

Removing compact disk P from magazine M only partly instead of completely saves a lot of space. It also takes considerably less time to remove a disk from the magazine and thrust it back in.

Figure 2:
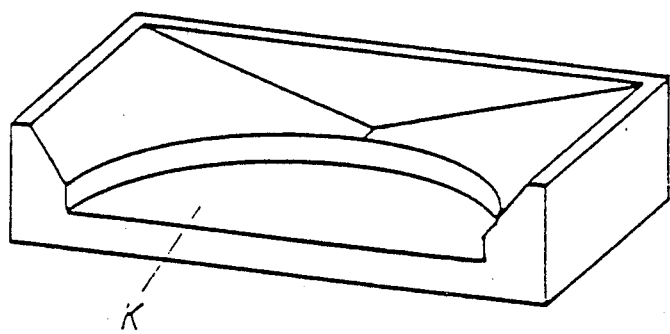
FIG. 2 illustrates one compartment in the magazine.

FIG. 2 illustrates an especially practical embodiment of the invention with a semicircular recess K in the floor of each compartment in magazine M. The diameter of recess K is slightly longer than the outer diameter of the disks. Compact disk P is precisely centered in recess K while being played. The advantage of the recess is that each compartment in magazine M can be lowered from floor to roof because the recess allows the disk to rotate freely. The decrease in height of each compartment in turn makes the magazine as a whole lower from top to bottom, saving even more space.

The invention is in no way limited to compact-disk players but is appropriate for any equipment that reads information from a disk-shaped recording medium whether the scanner is in contact with the medium or not.

I claim:

1. A record player comprising: a magazine having compartments for storing a plurality of rigid and flexible disk-shaped recording media; means for removing said disk-shaped recording media one at a time from said compartments in said magazine; disk drive means for engaging a bore in each of said recording media to play said recording media; said recording media being removable one at a time by said removing means to a minimum position necessary to expose said bore of a recording medium for engagement with said disk drive means; said compartments extending to an open side of said magazine from which said recording media are removed; each of said compartments having a floor with a semi-circular recess at said open side of said magazine; said recess therein having a diameter substantially longer than an outer diameter of a respective disk-shaped recording medium so that said recording medium can rotate freely while being player; each of said compartments having a storage recess above said semi-circular recess for fully storing said recording medium; said removing means lowering the medium to be played from said storage recess into said semi-circular recess for playing the recording medium, said recording medium being freely rotatable within said semi-circular recess after being lowered into said semi-circular recess.

* * * * *